(12) United States Patent
Qin et al.

(10) Patent No.: US 11,119,356 B2
(45) Date of Patent: Sep. 14, 2021

(54) FLEXIBLE BACKLIGHT, METHOD FOR MANUFACTURING THE SAME, AND DISPLAY DEVICE

(71) Applicant: BOE TECHNOLOGY GROUP CO., LTD., Beijing (CN)

(72) Inventors: Shuangliang Qin, Beijing (CN); Dongxiu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 175 days.

(21) Appl. No.: 16/054,761

(22) Filed: Aug. 3, 2018

(65) Prior Publication Data
US 2019/0204682 A1 Jul. 4, 2019

(30) Foreign Application Priority Data
Jan. 2, 2018 (CN) .......................... 201810001066.0

(51) Int. Cl.
*G02F 1/13357* (2006.01)
*G02F 1/1333* (2006.01)
(Continued)

(52) U.S. Cl.
CPC ...... *G02F 1/133602* (2013.01); *G02F 1/1343* (2013.01); *G02F 1/133305* (2013.01);
(Continued)

(58) Field of Classification Search
None
See application file for complete search history.

(56) References Cited

U.S. PATENT DOCUMENTS 6,650,393 B1 * 11/2003 Nishiguchi ........... G02F 1/1339
349/156
2006/0097640 A1 5/2006 Hatanaka et al.
(Continued)

FOREIGN PATENT DOCUMENTS

CN 1801437 A 7/2006
CN 1841631 A 10/2006
(Continued)

OTHER PUBLICATIONS

First Office Action, including Search Report, for Chinese Patent Application No. 201810001066.0, dated Dec. 23, 2019, 21 pages.

*Primary Examiner* — Mary Ellen Bowman
(74) *Attorney, Agent, or Firm* — Westman, Champlin & Koehler, P.A.

(57) ABSTRACT

The present disclosure provides a flexible backlight, a method for manufacturing the same, and a display device. The flexible backlight includes: a first flexible substrate and a second flexible substrate arranged opposite to each other; a plurality of spacers arranged between the first flexible substrate and the second flexible substrate, for supporting a spacing between the first flexible substrate and the second flexible substrate, and for forming an accommodating chamber between the first flexible substrate and the second flexible substrate; a first electrode and a second electrode for forming an electric field; a gas contained in the accommodating chamber, in which the gas is capable of emitting a non-visible light by the action of the electric field; and a photoexcitation layer arranged on the second flexible substrate, in which the photoexcitation layer can emit a visible light under illumination of the non-visible light and is in contact with the spacer.

14 Claims, 3 Drawing Sheets

(51) Int. Cl.
*G02F 1/1335* (2006.01)
*G02F 1/161* (2006.01)
*G02F 1/1343* (2006.01)
*H01J 17/38* (2006.01)

(52) U.S. Cl.
CPC .. *G02F 1/133553* (2013.01); *G02F 1/133604* (2013.01); *G02F 1/161* (2013.01); *H01J 17/38* (2013.01); *G02F 1/133614* (2021.01)

(56) References Cited

U.S. PATENT DOCUMENTS

| | | | |
|---|---|---|---|
| 2006/0138964 A1* | 6/2006 | Ko | H01J 61/16 313/639 |
| 2006/0220517 A1 | 10/2006 | Son et al. | |
| 2007/0114928 A1* | 5/2007 | Chang | H01J 65/046 313/582 |
| 2008/0174243 A1* | 7/2008 | Kim | H01J 11/12 313/582 |
| 2017/0242299 A1* | 8/2017 | Cui | H01L 27/124 |
| 2018/0088712 A1* | 3/2018 | Kim | G02F 1/13338 |

FOREIGN PATENT DOCUMENTS

| | | |
|---|---|---|
| CN | 103471011 A | 12/2013 |
| CN | 104409317 A | 3/2015 |
| JP | 2003272528 A | 9/2003 |

\* cited by examiner

FLEXIBLE BACKLIGHT, METHOD FOR MANUFACTURING THE SAME, AND DISPLAY DEVICE

CROSS-REFERENCE TO RELATED APPLICATION

The present disclosure claims a priority to Chinese Patent Application No. 201810001066.0 filed on Jan. 2, 2018, the disclosures of which are incorporated in their entirety by reference herein.

TECHNICAL FIELD

The present disclosure relates to the field of display technology, in particular to a flexible backlight, a method for manufacturing the same, and a display device.

BACKGROUND

With the development of display technology, flexible display technology has become a new favorite in the market. Various companies in the field have invested heavily in research and development of flexible active-matrix organic light-emitting diode (AM-OLED) display technology, but the design and manufacture for flexible AM-OLED display have a fairly high benchmark. On the other hand, the benchmark for the manufacture of liquid crystal display (LCD) is relatively low, but the biggest problem to be solved is the problem concerning to the flexible backlight in order to achieve a flexible display based on the LCD display in the related art.

SUMMARY

One Embodiment of the present invention provides the following technical solutions.

In one aspect, a flexible backlight is provided, which includes:

a first flexible substrate and a second flexible substrate arranged opposite to each other;

a plurality of spacers arranged between the first flexible substrate and the second flexible substrate, for supporting a spacing between the first flexible substrate and the second flexible substrate, thereby forming an accommodating chamber between the first flexible substrate and the second flexible substrate;

a first electrode and a second electrode for forming an electric field;

a gas contained in the accommodating chamber, in which the gas is capable of emitting a non-visible light by the action of the electric field; and a photoexcitation layer arranged on the second flexible substrate, in which the photoexcitation layer is capable of emitting a visible light under illumination of the non-visible light and is in contact with the spacer.

Optionally, the non-visible light is an ultraviolet light, and the photoexcitation layer is a fluorescent layer.

Optionally, the flexible backlight further includes a light reflecting layer arranged on a side of the first flexible substrate close to the second flexible substrate.

Optionally, a material of the light reflecting layer includes a metal, and the light reflecting layer is also used as the first electrode.

Optionally, the flexible backlight further includes:

a first protective layer arranged on a side of the light reflecting layer close to the second flexible substrate.

Optionally, the spacer is made of a conductive material, and also used as the second electrode.

Optionally, a cross section of the spacer along a plane perpendicular to the second flexible substrate is in a shape of a trapezoid, a part of an ellipse, an ellipse or a circle.

Optionally, the flexible backlight further includes:

a second protective layer arranged on a side of the second flexible substrate close to the first flexible substrate.

Optionally, the spacer is made of an inorganic material, and the flexible backlight further includes a transparent conductive layer arranged between the second flexible substrate and the second protective layer and used as the second electrode.

Optionally, a thickness of the accommodating chamber is not more than 1 mm.

Optionally, the gas includes argon or neon.

One embodiment of the present disclosure further provides a display device including the flexible backlight as described above.

One embodiment of the present disclosure further provides a method for manufacturing a flexible backlight, which includes:

providing a first flexible substrate and a second flexible substrate;

forming a plurality of spacers on the first flexible substrate or the second flexible substrate;

forming a photoexcitation layer on the second flexible substrate, in which the photoexcitation layer is capable of emitting a visible light under illumination of a non-visible light;

forming a first electrode and a second electrode on the first flexible substrate and/or the second flexible substrate, to form an electric field;

encapsulating the first flexible substrate and the second flexible substrate together, to arrange the plurality of spacers between the first flexible substrate and the second flexible substrate and in contact with the photoexcitation layer, thereby forming an accommodating chamber between the first flexible substrate and the second flexible substrate; and filling a gas into the accommodating chamber, in which the gas is capable of emitting the non-visible light by the action of the electric field.

Optionally, the forming the first electrode and the second electrode on the first flexible substrate and/or the second flexible substrate includes forming, on the first flexible substrate, a light reflecting layer used as the first electrode, and the plurality of spacers are formed of a conductive material and used as the second electrode.

Optionally, the manufacturing method further includes:

forming a first protective layer between the light reflecting layer and the plurality of spacers; and forming a second protective layer between the second flexible substrate and the photoexcitation layer.

Optionally, the spacer is made of an inorganic material, and the forming the first electrode and the second electrode on the first flexible substrate and/or the second flexible substrate includes:

forming, on the first flexible substrate, a light reflecting layer used as the first electrode; and forming, between the second flexible substrate and the photoexcitation layer, a transparent conductive layer used as the second electrode.

Optionally, the manufacturing method further includes:

forming a first protective layer between the light reflecting layer and the plurality of spacers; and forming a second protective layer between the transparent conductive layer and the photoexcitation layer.

DETAILED DESCRIPTION

Figure 1:
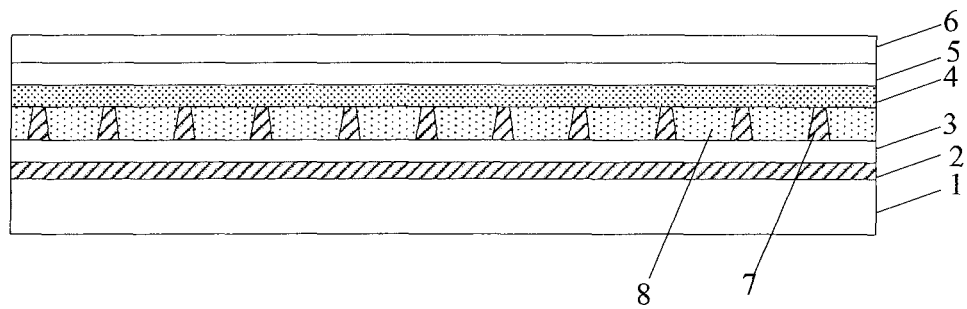
FIG. 1 is a schematic view of a flexible backlight according to an embodiment of the present disclosure.

In order to make the technical problems to be solved, the technical solutions, and the advantages of the examples of the present disclosure, the present disclosure will be described hereinafter in conjunction with the drawings and specific examples.

In order to solve the problem that the backlight of the liquid crystal display is not bendable in the related art, one embodiment of the present disclosure provides a flexible backlight, a method for manufacturing the same and a display device, which are capable of solving the problem that the backlight of liquid crystal display is not bendable and overcoming the biggest obstacle of flexible LCD display.

One embodiment of the present disclosure provides a flexible backlight, which includes:

a first flexible substrate and a second flexible substrate arranged opposite to each other;

a plurality of spacers arranged between the first flexible substrate and the second flexible substrate, for supporting a spacing between the first flexible substrate and the second flexible substrate, thereby forming an accommodating chamber between the first flexible substrate and the second flexible substrate;

a first electrode and a second electrode for forming an electric field;

a gas contained in the accommodating chamber, in which the gas is capable of emitting a non-visible light by the action of the electric field; and a photoexcitation layer arranged on the second flexible substrate, in which the photoexcitation layer is capable of emitting a visible light under illumination of the non-visible light and is in contact with the spacer.

In this embodiment, the flexible backlight includes a first flexible substrate and a second flexible substrate arranged opposite to each other; a spacer arranged between the first flexible substrate and the second flexible substrate, for supporting a spacing between the first flexible substrate and the second flexible substrate, thereby forming an accommodating chamber between the first flexible substrate and the second flexible substrate; and a gas contained in the accommodating chamber. The flexible backlight further includes a first electrode and a second electrode capable of providing an electric field, and by the action of the electric field formed by the first electrode and the second electrode, the gas is can be ionized and thus generating a non-visible light, thereby exciting the photoexcitation layer arranged on the second flexible substrate to emit light. Since the backlight according to one embodiment of the present disclosure is formed based on a flexible substrate, the backlight of the present disclosure is bendable, thereby solving the problem that the TFT-LCD backlight in the related art are not bendable; and achieving TFT-LCD flexible display by cooperating with a liquid crystal display panel. The planar backlight prepared in this way has the advantages of ultra-thin thickness and flexibility, and may be applied widely.

Further, the non-visible light may be an ultraviolet light, and the photoexcitation layer may be a fluorescent layer.

Further, a light reflecting layer may be arranged on a side of the first flexible substrate close to the second flexible substrate, and the light reflecting layer may reflect light, which is emitted from the photoexcitation layer and transmitted to the side of the first flexible substrate, to the side of the second flexible substrate, thereby improving the utilization rate of light.

Further, the material of the light reflecting layer may include a metal, and the light reflecting layer may be also used as the first electrode. Thus, there is no need to provide a dedicated first electrode, thereby simplifying the structure of the flexible backlight and reducing the manufacture cost of the flexible backlight.

Since the gas can be ionized to generate plasma by the action of the electric field, a first protective layer may be arranged on a side of the light reflecting layer close to the second flexible substrate in order to prevent the plasma from damaging the light reflecting layer. Since the plasma can easily damage an organic material, the first protective layer may, for example, be made of an inorganic material.

When the spacer is made of a conductive material, it may be also used as the second electrode. Thus, there is no need to provide a dedicated second electrode, thereby simplifying the structure of the flexible backlight and reducing the manufacture cost of the flexible backlight.

Further, a cross section of the spacer along a plane perpendicular to the second flexible substrate may be in a shape of a trapezoid, a part of an ellipse, an ellipse or a circle. Of course, the spacer may also have other shapes as long as it is capable of supporting the spacing between the first flexible substrate and the second flexible substrate.

Since the gas can be ionized to generate plasma by the action of the electric field, a second protective layer may be arranged on a side of the second flexible substrate close to the first flexible substrate in order to prevent the plasma from damaging the second flexible substrate. Since the plasma can easily damage an organic material, the second protective layer may, for example, be made of an inorganic material.

Since the gas can be ionized to generate plasma by the action of the electric field and the plasma can easily damage the organic material, the spacer may, for example, be made of a metal or an inorganic material. When the spacer is made of an inorganic material, a transparent conductive layer may be arranged between the second flexible substrate and the second protective layer and used as the second electrode. Since the side of the second flexible substrate is the light exiting side in this embodiment, the second electrode should not affect the light exiting, and thus a transparent conductive material needs to be used. In addition, the transparent conductive layer is arranged between the second flexible substrate and the second protective layer in order to prevent the plasma from damaging the transparent conductive layer.

Further, the thickness of the accommodating chamber may be not more than 1 mm, such that the flexible backlight may become ultra-thin.

The gas in the accommodating chamber may, for example, be a gas having a relatively low light-up voltage, so that in the case that the electric field strength is not relatively high, the gas may be ionized to generate plasma by the action of the electric field, thereby emitting a non-visible light. For example, the gas may be argon or neon.

Figure 2:
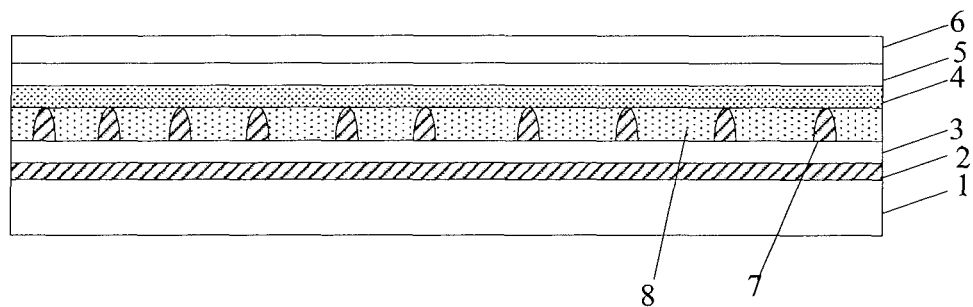
FIG. 2 is a schematic view of a flexible backlight according to a further embodiment of the present disclosure.
Figure 3:
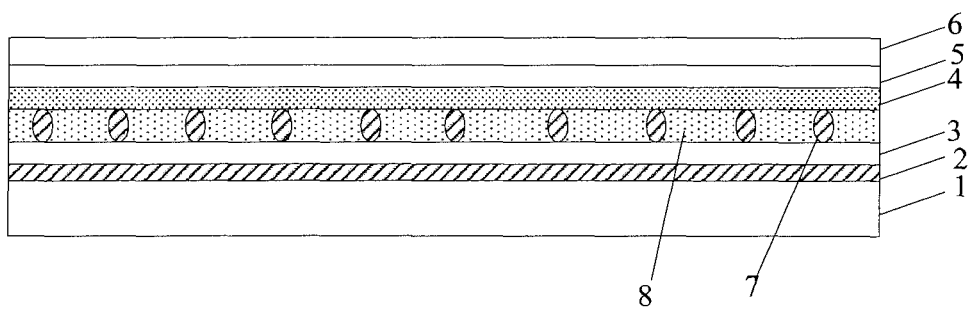
FIG. 3 is a schematic view of a flexible backlight according to a yet embodiment of the present disclosure.
Figure 4:
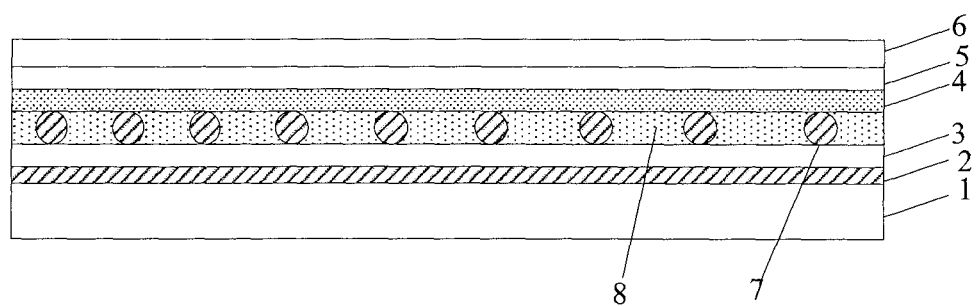
FIG. 4 is a schematic view of a flexible backlight according to a further yet embodiment of the present disclosure.

In one embodiment, as shown in FIGS. 1 to 4, the flexible backlight of the present disclosure includes: a first flexible substrate 1 and a second flexible substrate 6 arranged opposite to each other; a light reflecting layer 2 and a first protective layer 3 arranged in sequence on a side of the first flexible substrate 1 facing the second flexible substrate 6; a plurality of spacers 7 arranged on the first protective layer 3; a second protective layer 5 and a fluorescent layer 4 arranged in sequence on a side of the second flexible substrate 6 facing the first flexible substrate 1, in which the spacer 7 is capable of supporting a spacing between the first flexible substrate 1 and the second flexible substrate 6, thereby forming an accommodating chamber between the first flexible substrate 1 and the second flexible substrate 6; and a gas 8 contained in the accommodating chamber, in which the spacer 7 is in contact with the fluorescent layer 4. In addition, as shown in FIG. 1, the cross section of the spacer 7 along a plane perpendicular to the second flexible substrate 6 may be in a shape of a trapezoid. As shown in FIG. 2, the cross section of the spacer 7 along a plane perpendicular to the second flexible substrate 6 may be in a shape of a part of an ellipse. As shown in FIG. 3, the cross section of the spacer 7 along a plane perpendicular to the second flexible substrate 6 may be in a shape of an ellipse. As shown in FIG. 4, the cross section of the spacer 7 along a plane perpendicular to the second flexible substrate 6 may be in a shape of a circle.

Figure 5:
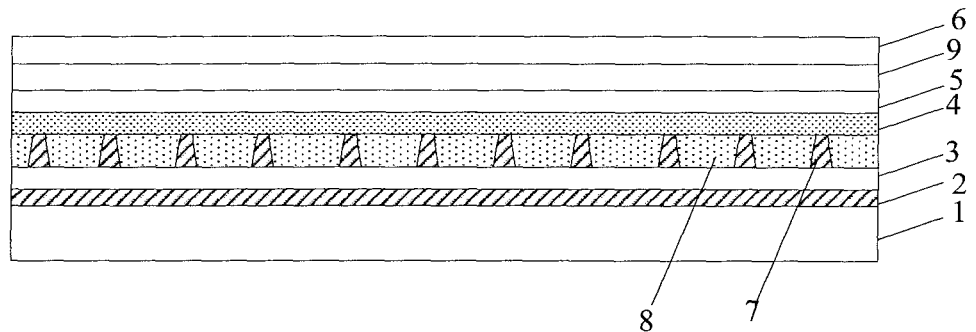
FIG. 5 is a schematic view of a flexible backlight according to a still further embodiment of the present disclosure.

In one example of this embodiment, both the light reflecting layer 2 and the spacer 7 may be made of a conductive material such as a metal. After an electrical signal is applied to the light reflecting layer 2 and the spacer 7, an electric field may be formed. The gas 8 is capable of emitting an ultraviolet light by the action of the electric field, to excite the fluorescent layer 4 to emit a visible light. In another example of this embodiment, the light reflecting layer 2 may be made of a conductive material such as a metal, and the spacer may be made of an inorganic material. In addition, as shown in FIG. 5, a transparent conductive layer 9 may be arranged between the second flexible substrate 6 and the second protective layer 5. After an electrical signal is applied to the light reflecting layer 2 and the transparent conductive layer 9, an electric field may be formed. The gas 8 is capable of emitting an ultraviolet light by the action of the electric field, to excite the fluorescent layer 4 to emit a visible light.

Since the backlight of the embodiment of the present disclosure is formed based on the first flexible substrate 1 and the second flexible substrate 6, the backlight is bendable, thereby solving the problem that the TFT-LCD backlight in the related art are not bendable; and may achieve TFT-LCD flexible display by cooperating with a liquid crystal display panel. It has the advantages of ultra-thin thickness and flexibility, and may be applied widely.

One embodiment of the present disclosure further provides a display device including the flexible backlight as described above. The display device may be any product or component having a display function, such as a liquid crystal television, a liquid crystal display, a digital photo frame, a mobile phone, a tablet computer, etc., in which the display device may further include a flexible circuit board, a printed circuit board, and a backplane.

Figure 6:
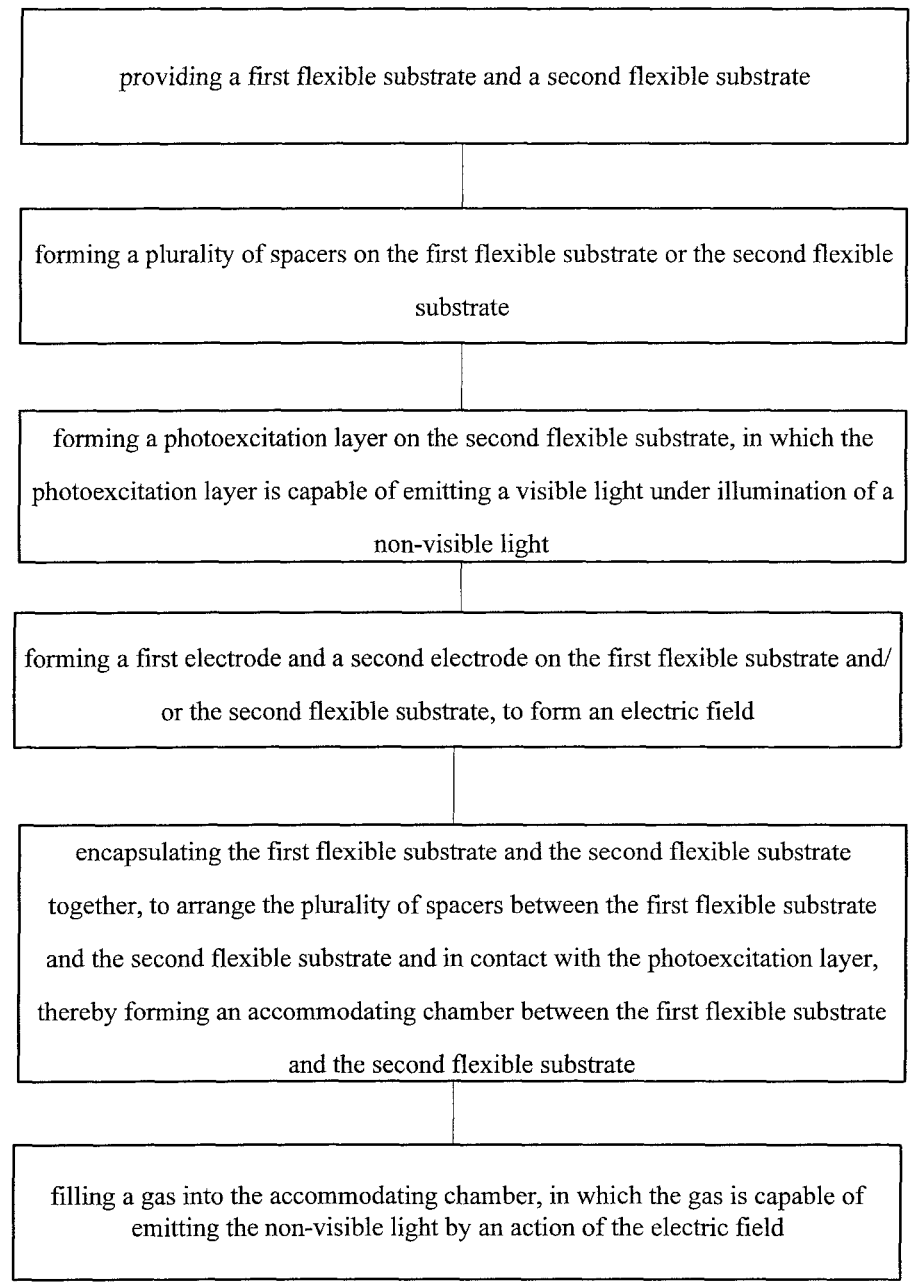
FIG. 6 is a flow chart of a method for manufacturing a flexible backlight according to an embodiment of the present disclosure.

One example of the present disclosure further provides a method for manufacturing a flexible backlight, as shown in FIG. 6, which includes:

providing a first flexible substrate and a second flexible substrate;

forming a plurality of spacers on the first flexible substrate or the second flexible substrate;

forming a photoexcitation layer on the second flexible substrate, in which the photoexcitation layer is capable of emitting a visible light under illumination of a non-visible light;

forming a first electrode and a second electrode on the first flexible substrate and/or the second flexible substrate, to form an electric field;

encapsulating the first flexible substrate and the second flexible substrate together, to arrange the plurality of spacers between the first flexible substrate and the second flexible substrate and in contact with the photoexcitation layer, thereby forming an accommodating chamber between the first flexible substrate and the second flexible substrate; and filling a gas into the accommodating chamber, in which the gas is capable of emitting the non-visible light by the action of the electric field.

In the embodiment of the present disclosure, the manufactured flexible backlight includes a first flexible substrate and a second flexible substrate arranged opposite to each other; a spacer arranged between the first flexible substrate and the second flexible substrate, for supporting a spacing between the first flexible substrate and the second flexible substrate, thereby forming an accommodating chamber between the first flexible substrate and the second flexible substrate; and a gas contained in the accommodating chamber. The flexible backlight further includes a first electrode and a second electrode capable of providing an electric field, and by the action of the electric field formed by the first electrode and the second electrode, the gas can be ionized and thus generating a non-visible light, thereby exciting the photoexcitation layer on the second flexible substrate to emit light. Since the backlight of the present disclosure is formed based on a flexible substrate, the backlight of the present disclosure is bendable, thereby solving the problem that the TFT-LCD backlight in the related art are not bendable; and may achieve TFT-LCD flexible display by cooperating with a liquid crystal display panel. The planar backlight prepared in this way has the advantages of ultra-thin thickness and flexibility, and may be applied widely.

In one embodiment, the manufacturing method may include the following steps.

Step A1, for providing a first flexible substrate.

The first flexible substrate may further be a polyimide film.

Step A2, for forming a light reflecting layer made of a conductive material on the first flexible substrate.

The light reflecting layer may reflect light, which is emitted from the photoexcitation layer and transmitted to the side of the first flexible substrate, to the side of the second flexible substrate, thereby improving the utilization rate of light. When the light reflecting layer is made of a conductive material such as metal, it may be also used as the first electrode. Thus, there is no need to provide a dedicated first electrode, thereby simplifying the structure of the flexible backlight and reducing the manufacture cost of the flexible backlight.

Step A3, for forming a first protective layer on the light reflecting layer.

Since the gas can be ionized to generate plasma by the action of the electric field, the first protective layer is arranged on a side of the light reflecting layer close to the second flexible substrate in order to prevent the plasma from damaging the light reflecting layer. Since the plasma can easily damage an organic material, the first protective layer may, for example, be made of an inorganic material.

Step A4, for forming a plurality of spacers made of a conductive material on the first protective layer.

The height of the spacer is not more than 1 mm, such that the flexible backlight may become ultra-thin.

When the spacer is made of a conductive material, it may be also used as the second electrode. Thus, there is no need to provide a dedicated second electrode, thereby simplifying the structure of the flexible backlight and reducing the manufacture cost of the flexible backlight.

Step A5, for providing a second flexible substrate.

The second flexible substrate may be a polyimide film.

Step A6, for forming a second protective layer on the second flexible substrate.

Since the gas can be ionized to generate plasma by the action of the electric field, the second protective layer is arranged on a side of the second flexible substrate close to the first flexible substrate in order to prevent the plasma from damaging the second flexible substrate. Since the plasma can easily damage an organic material, the second protective layer may, for example, be made of an inorganic material.

Step A7, for forming the photoexcitation layer on the second protective layer.

The photoexcitation layer may further be a fluorescent layer capable of emitting a visible light when excited by an ultraviolet light.

Step A8, for encapsulating the first flexible substrate and the second flexible substrate together, to arrange the plurality of spacers between the first flexible substrate and the second flexible substrate and in contact with the photoexcitation layer.

Step A9, for filling a gas into the accommodating chamber between the first flexible substrate and the second flexible substrate.

The gas may, for example, be a gas having a relatively low light-up voltage, so that in the case that the electric field strength is not relatively high, the gas may be ionized to generate plasma by the action of the electric field, thereby emitting a non-visible light. Therefore, the gas may be argon or neon capable of emitting ultraviolet light by the action of the electric field, so as to excite the fluorescent layer to emit a visible light.

The flexible backlight of this embodiment may be manufactured by the above steps A1 to A9. Since the backlight of this embodiment is formed based on the first flexible substrate and the second flexible substrate, the backlight of this embodiment is bendable, thereby solving the problem that the TFT-LCD backlight in the related art are not bendable; and may achieve TFT-LCD flexible display by cooperating with a liquid crystal display panel. It has the advantages of ultra-thin thickness and flexibility, and may be applied widely.

In another embodiment, the manufacturing method may include the following steps.

Step B1, for providing a first flexible substrate.

The first flexible substrate may further be a polyimide film.

Step B2, for forming a light reflecting layer made of a conductive material on the first flexible substrate.

The light reflecting layer may reflect light, which is emitted from the photoexcitation layer and transmitted to the side of the first flexible substrate, to the side of the second flexible substrate, thereby improving the utilization rate of light. When the light reflecting layer is made of a conductive material such as metal, it may be also used as the first electrode. Thus, there is no need to provide a dedicated first electrode, thereby simplifying the structure of the flexible backlight and reducing the manufacture cost of the flexible backlight.

Step B3, for forming a first protective layer on the light reflecting layer.

Since the gas can be ionized to generate plasma by the action of the electric field, the first protective layer is arranged on a side of the light reflecting layer close to the second flexible substrate in order to prevent the plasma from damaging the light reflecting layer. Since the plasma can easily damage an organic material, the first protective layer may, for example, be made of an inorganic material.

Step B4, for forming a plurality of spacers made of an inorganic material on the first protective layer.

The height of the spacer is not more than 1 mm, such that the flexible backlight may become ultra-thin. Since the plasma can easily damage an organic material, the spacer may, for example, be made of an inorganic material.

Step B5, for providing a second flexible substrate.

The second flexible substrate may further be a polyimide film.

Step B6, for forming a transparent conductive layer on the second flexible substrate.

The transparent conductive layer may be made of ITO or IZO. A transparent conductive layer may be used as the second electrode. Since the side of the second flexible substrate is the light exiting side, the second electrode should not affect the light exiting, and thus a transparent conductive material needs to be used.

Step B7, for forming a second protective layer on the transparent conductive layer.

Since the gas can be ionized to generate plasma by the action of the electric field, the second protective layer is arranged on a side of the transparent conductive layer close to the first flexible substrate in order to prevent the plasma from damaging the transparent conductive layer. Since the plasma can easily damage an organic material, the second protective layer may, for example, be made of an inorganic material.

Step B8, for forming the photoexcitation layer on the second protective layer.

The photoexcitation layer may further be a fluorescent layer capable of emitting a visible light when excited by an ultraviolet light.

Step B9, for encapsulating the first flexible substrate and the second flexible substrate together, to arrange the plurality of spacers between the first flexible substrate and the second flexible substrate and in contact with the photoexcitation layer.

Step B10, for filling the gas into the accommodating chamber.

The gas may, for example, be a gas having a relatively low light-up voltage, so that in the case that the electric field strength is not relatively high, the gas may be ionized to generate plasma by the action of the electric field, thereby emitting a non-visible light. Therefore, the gas may be argon or neon capable of emitting ultraviolet light by the action of the electric field to excite the fluorescent layer to emit a visible light.

The flexible backlight of this embodiment may be manufactured by the above steps B1 to B10. Since the backlight of this embodiment is formed based on the first flexible substrate and the second flexible substrate, the backlight of this embodiment is bendable, thereby solving the problem that the TFT-LCD backlight in the related art are not bendable; and may achieve TFT-LCD flexible display by cooperating with a liquid crystal display panel. It has the advantages of ultra-thin thickness and flexibility, and may be applied widely.

In the method embodiments of the present disclosure, the serial numbers of the steps cannot be used to define the sequence of the steps. As for one skilled in the art, the changes in the order of steps without paying creative work also fall within the scope of the present disclosure.

Unless otherwise defined, technical terms or scientific terms used herein have the normal meaning commonly understood by one skilled in the art in the field of the present disclosure. The words "first", "second", and the like used in the present disclosure does not denote any order, quantity, or importance, but rather merely serves to distinguish different components. The "including", "comprising", and the like used in the present disclosure means that the element or item appeared in front of the word encompasses the element or item and their equivalents listed after the word, and does not exclude other elements or items. The word "connected" or "connecting" and the like are not limited to physical or mechanical connections, but may include electrical connections, whether direct or indirect. "On", "under", "left", "right" and the like are only used to represent relative positional relationships, and when the absolute position of the described object is changed, the relative positional relationship may also be changed, accordingly.

It will be understood that when an element, such as a layer, film, area, or substrate, is referred to as being "on" or "under" another element, the element can be directly "on" or "under" another element, or there may be an intermediate element.

The above descriptions are preferred embodiments of the present disclosure. It should be noted that one skilled in the art would make several improvements and substitutions without departing from the principles of the present disclosure. These improvements and modifications should also be regarded as the protection scope of the present disclosure.

What is claimed is:

1. A flexible backlight, comprising:
   a first flexible substrate and a second flexible substrate arranged opposite to each other;
   a plurality of spacers arranged between the first flexible substrate and the second flexible substrate, for supporting a spacing between the first flexible substrate and the second flexible substrate, thereby forming an accommodating chamber between the first flexible substrate and the second flexible substrate;
   a first electrode and a second electrode for forming an electric field;
   a gas contained in the accommodating chamber, wherein the gas is capable of emitting a non-visible light by an action of the electric field;
   a photoexcitation layer arranged on the second flexible substrate, wherein the photoexcitation layer is capable of emitting a visible light under illumination of the non-visible light and is in contact with the spacer; and
   a light reflecting layer arranged on a side of the first flexible substrate close to the second flexible substrate, wherein the light reflecting layer is only made of a metal, and the light reflecting layer is also used as the first electrode,
   wherein the spacer is only made of conductive material, and also used as the second electrode.

2. The flexible backlight according to claim 1, wherein the non-visible light is an ultraviolet light, and the photoexcitation layer is a fluorescent layer.

3. The flexible backlight according to claim 1, wherein the flexible backlight further comprises:
   a first protective layer arranged on a side of the light reflecting layer close to the second flexible substrate.

4. The flexible backlight according to claim 1, wherein a cross section of the spacer along a plane perpendicular to the second flexible substrate is in a shape of a trapezoid, a part of an ellipse, an ellipse or a circle.

5. The flexible backlight according to claim 1, further comprising:
   a second protective layer arranged on a side of the second flexible substrate close to the first flexible substrate.

6. The flexible backlight according to claim 5, wherein the spacer is made of an inorganic material, and the flexible backlight further comprises a transparent conductive layer arranged between the second flexible substrate and the second protective layer and used as the second electrode.

7. The flexible backlight according to claim 1, wherein a thickness of the accommodating chamber is not more than 1 mm.

8. The flexible backlight according to claim 1, wherein the gas comprises argon or neon.

9. A display device, comprising a flexible backlight, a flexible circuit board, a printed circuit board, and a backplane, wherein the flexible backlight, comprises:
   a first flexible substrate and a second flexible substrate arranged opposite to each other;
   a plurality of spacers arranged between the first flexible substrate and the second flexible substrate, for supporting a spacing between the first flexible substrate and the second flexible substrate, thereby forming an accommodating chamber between the first flexible substrate and the second flexible substrate;
   a first electrode and a second electrode for forming an electric field;
   a gas contained in the accommodating chamber, wherein the gas is capable of emitting a non-visible light by an action of the electric field;
   a photoexcitation layer arranged on the second flexible substrate, wherein the photoexcitation layer is capable of emitting a visible light under illumination of the non-visible light and is in contact with the spacer; and
   a light reflecting layer arranged on a side of the first flexible substrate close to the second flexible substrate, wherein the light reflecting layer is only made of a metal, and the light reflecting layer is also used as the first electrode,
   wherein the spacer is only made of a conductive material, and also used as the second electrode.

10. The display device according to claim 9, wherein the flexible backlight further comprises a second protective layer arranged on a side of the second flexible substrate close to the first flexible substrate, and a transparent conductive layer arranged between the second flexible substrate and the second protective layer and used as the second electrode, and the spacer is made of an inorganic material.

11. A method for manufacturing a flexible backlight, comprising:
    providing a first flexible substrate and a second flexible substrate;
    forming a plurality of spacers on the first flexible substrate or the second flexible substrate;

forming a photoexcitation layer on the second flexible substrate, wherein the photoexcitation layer is capable of emitting a visible light under illumination of a non-visible light;

forming a first electrode and a second electrode on the first flexible substrate and/or the second flexible substrate, to form an electric field, wherein the forming the first electrode and the second electrode on the first flexible substrate and/or the second flexible substrate comprises forming, on the first flexible substrate, a light reflecting layer is only made of a metal and used as the first electrode;

encapsulating the first flexible substrate and the second flexible substrate together, to arrange the plurality of spacers between the first flexible substrate and the second flexible substrate and in contact with the photoexcitation layer, thereby forming an accommodating chamber between the first flexible substrate and the second flexible substrate; and filling a gas into the accommodating chamber, wherein the gas is capable of emitting the non-visible light by an action of the electric field, wherein the plurality of spacer are only formed of a conductive material and used as the second electrode.

12. The method according to claim 11, wherein the method further comprises:
   forming a first protective layer between the light reflecting layer and the plurality of spacers; and
   forming a second protective layer between the second flexible substrate and the photoexcitation layer.

13. The method according to claim 11, wherein
   the spacer is made of an inorganic material, and
   the forming the first electrode and the second electrode on the first flexible substrate and/or the second flexible substrate comprises:
   forming, on the first flexible substrate, a light reflecting layer used as the first electrode; and
   forming, between the second flexible substrate and the photoexcitation layer, a transparent conductive layer used as the second electrode.

14. The method according to claim 13, wherein the method further comprises:
   forming a first protective layer between the light reflecting layer and the plurality of spacers; and
   forming a second protective layer between the transparent conductive layer and the photoexcitation layer.

* * * * *